Patented Apr. 2, 1940

2,196,090

UNITED STATES PATENT OFFICE 2,196,090

ABRASIVE MATERIAL

Lorenzo Stone Washburn, Welwyn Garden City, England, assignor to Norton Company, Worcester, Mass., a corporation of Massachusetts No Drawing. Application November 29, 1935, Serial No. 52,072

2 Claims. (Cl. 51—280)

The invention relates to grinding wheels.

One object of the invention is to provide an improved method of making a rubber grinding wheel. Another object of the invention is to provide a wheel bonded with oxidized rubber or oxygen containing rubber derivative. Another object of the invention is to provide an oxidized rubber wheel. Another object of the invention is to provide a rubber grinding wheel of free cutting qualities. Another object of the invention is to provide an open structure rubber wheel. Another object of the invention is to provide a free cutting open structure resinous wheel. Another object of the invention is to provide a wheel of hard quality (structure hardness of the wheel as distinguished from the hardness of abrasive grain). Another object of the invention is to provide a wheel which is of high wear resisting quality. Another object of the invention is to provide a rubber bond and a method of bonding with rubber particularly applicable to the manufacture of diamond wheels. Another object of the invention is to provide a liquid rubber product suitable for the manufacture of bonded abrasive structures. Other objects of the invention are to provide compositions, methods, and articles having the foregoing desirable characteristics when used for, applied to the manufacture of, or embodied in abrasive structures other than grinding wheels, for example rubbing blocks, bricks, honing sticks, lapping structures, lapping wheels, regulating wheels, sharpening sticks, hones and similar products. Other objects will be in part obvious or in part pointed out hereinafter.

The invention accordingly consists in the features of construction, the ingredients, and in the several steps and relation and order of each of said steps to one or more of the others thereof, all as will be illustratively described herein.

I provide a quantity of abrasive grain of any type desired. In so much as low temperatures (as compared with kiln temperatures) are used to set the bond, it is effective for diamond grain as well as for aluminum oxide grain and silicon carbide grain. It is practical and economical to make a rubber bonded diamond wheel according to the invention. So far as certain features of the invention are concerned, any abrasive might be used, for example, those mentioned also corundum, emery, garnet, quartz and boron carbide. Certain advantages inhere in a wheel of aluminum oxide bonded with the bond of the invention, and an embodiment of the invention will be described in connection with this particular type of abrasive grain.

For a specific embodiment of the invention, therefore, I take 75 per cent. by weight of aluminum oxide grain (the "regular" dense product) and 25 per cent. of the bond. While the above proportion is by way of example only, and also any grit size of abrasive grain may be used, I have achieved excellent results using chunky alumina grain of grit sizes 16 mesh or 46 mesh.

Again giving a specific example only, the bond may comprise 100 parts of oxidized rubber or oxygen containing rubber derivative, 50 parts of sulphur, and 25 parts of zinc oxide. This bond is a sticky viscous liquid.

Oxidized rubber is a resin produced by the oxidation of rubber and is exemplified by "Rubbone" which has a formula approximating $[(C_5H_8)_2O]_n$. Generically speaking the product and the final bond product is a rubber, although specifically they are oxidized rubber or oxygen containing rubber derivatives, which may be referred to as oxidized rubber resin.

"Rubbone" may be produced as follows:

Taking a quantity of milled blanket crepe rubber (caoutchouc) 20 parts by weight thereof is dissolved in 80 parts by weight of varnish makers' naphtha or white spirit to which is added ½ part of cobalt linoleate as a catalytic agent. The solution is then heated to 80° C. and is aerated (as by forcing air through it) until a sample drawn off from the bulk shows a quick separation of sediment and a clear supernatant solution of the resin. The solution is now clarified by "tanking" or centrifuging, and the solvent is then distilled off by steam or in vacuo to separate the resin.

The oxidation may be carried out with the rubber dissolved in other solvents, and other catalysts may be used, but the foregoing is an effective method for the preparation of "Rubbone". It is clear and amber colored.

One of the most advantageous features of oxidized rubber for the manufacture of grinding wheels and other abrasive products resides in the fact that it is a viscous, sticky liquid of the consistency of thick treacle; that is it will just flow at normal temperatures, and yet it is capable of being converted into a hardened or vulcanized product of great strength and toughness, as hard and strong as, or more so than, the high sulphur content hard rubber. This characteristic permits a simpler mixing method than that heretofore used. The oxidized rubber is, in fact, material in such a state that the abrasive material can be incorporated or occluded, with or without heat, by hand mixing or the use of ordinary mixing machines as distinct from masticating, calendering or other machinery primarily intended for working plastic solids.

The grain may be mixed with the bond in an internal type of mixer. Many variations in mixing grain and bond may be employed; an effective mixture may be made without the use of mixing rolls such as have heretofore been employed for the mixture of grain and hard rubber. Another feature of the invention is that it is possible to coat each grain with a desired amount of bond which results in the better control of grinding wheel structures and permits the manufacture of a more open and porous rubber bonded wheel than has been hitherto possible in regular commercial practice. Furthermore, the dangers of over-mastication of the rubber are substantially eliminated by the composition and procedure of the invention.

Considering now the further steps in the manufacture of a wheel, the mixture of abrasive and bond hereinbefore defined is first preheated in a loose state at a temperature of about 300° F. until it partially stiffens. During the heating it is well to stir the mixture at regular intervals. The mixture is cooled to form a plastic mass.

The mixture may now be rolled to produce a "green" sheet. It is well to lubricate the rolls liberally with French chalk during this operation. From the sheet, wheel blanks of the required diameter and hole size are cut out.

The wheel blanks may then be subjected to the vulcanizing treatment employed in the manufacture of the usual rubber bonded abrasive wheels. Thin wheels may be vulcanized without pressure as by heating on flat refractory plates. For thick wheels it is desirable to employ heat and pressure treatment to consolidate the mass; for example, one or more wheel blanks may be placed in a mold heated to approximately 300° F. so as to bring about a softening, subjected to a pressure of in the neighborhood of one ton per square inch and then cooled while maintaining a suitable pressure. The mold is then clamped up as for ordinary rubber wheels and subjected to vulcanization treatment at about 320° F. The duration of the vulcanization treatment depends upon the size of the wheel as is known in the art of making the usual rubber bonded wheels. To prevent the wheel from sticking to the mold plates I use two sheets of paper placed each side of the wheel, each sheet being dusted thoroughly with French chalk on each side. One sheet on each side may stick to the wheel but the other sheet successfully prevents sticking to the mold plate.

By following out the method hereinbefore given a hard rubber wheel of high tensile strength may be produced.

So far as I am able to determine, the chemical action which takes place involves a part of the sulphur acting to reduce oxidized rubber and part combining with the $C_5H_8$ rubber radicle to form hard vulcanized rubber. Probably the reducing action first occurs, oxygen going off with some of the sulphur as $SO_2$, and thereafter the rubber molecule combines with the sulphur to form the hard rubber. But I believe that not all of the oxygen is removed from the rubber and I believe that the final product includes some oxygen. Whereas a fully oxidized rubber is, so far as I am aware, not comparable in strength to sulfided or hard rubber, a rubber vulcanized with sulphur to a hard state and having some oxygen, either in combination or otherwise, appears actually to be stronger and tougher than the ordinary hard rubber, at least it has these qualities when mixed with abrasive grain to form a grinding wheel. The zinc oxide acts as a mild accelerator and a reinforcing agent or filler, and appears also to impart increased strength. Other metal oxides or other fillers could be used. One of the outstanding features of the invention resides in the fact that reduction of abrasive grain to a lower mesh size by the ordinary pressure or mixing rolls is entirely eliminated. Furthermore, by the use of a rubber oxide I achieve material advantages firstly in the method of manufacture of a rubber wheel and secondly in the final product. The excellence of the final product is due in part to the characteristics of the reduced and vulcanized oxidized rubber itself and also to the fact that the improved method permits the manufacture of wheel structures which as a practical matter could not be produced heretofore with a rubber bonded wheel. For example, I am enabled to make a very open structure wheel having, for a rubber wheel, high porosity, which results in a more free cutting and cooler wheel for the grinding of steel and other substances. The wheel made according to the invention has many advantages when embodied in a snagging wheel, and also many advantages when embodied in a cutting-off wheel, and furthermore, it will replace many vitrified wheels because it can be manufactured more quickly to specifications and difficulties in the manufacture of a rubber wheel, due to the extraordinary amount of mastication previously practiced, are considerably reduced. Furthermore, by reason of the fact that the bond is a liquid, diamonds can be bonded therewith which was not practical when the sheets had to be passed so many times between heavy rollers on account of much grain being lost in the mixing operation.

It will thus be seen that there has been provided by this invention a method, a composition and an article in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense. While I have stated my theory of the chemical reactions, it should be understood that this is only a theory and the described invention is not to be limited thereby.

Having now described my invention, what I claim as new and desire to secure by Letters Patent is:

1. A grinding wheel comprising abrasive grain and a bond including $[(C_5H_8)_2O]_n$.

2. An abrasive wheel prepared from an oxygen-containing rubber $[(C_5H_8)_2O]_n$ derivative, abrasive grain, zinc oxide and sulphur.

LORENZO STONE WASHBURN.